No. 645,500. Patented Mar. 13, 1900.
J. F. ZIEGLER.
FILTER.
(Application filed June 24, 1899.)
(No Model.) 2 Sheets—Sheet 1.
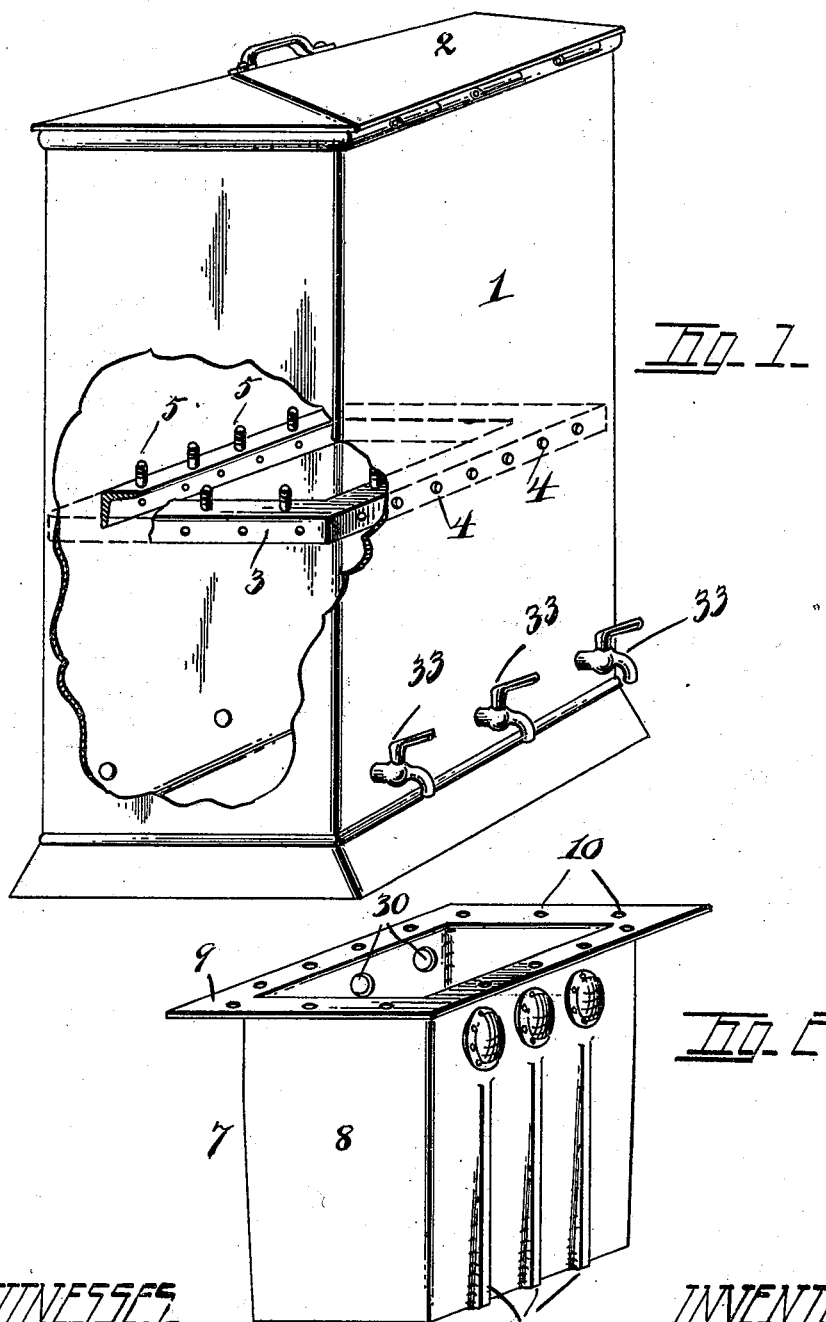
WITNESSES
Otto F. Pennra
Chas Defenbaugh
INVENTOR
John F. Ziegler
By Carl H. Keller
atty.
THE NORRIS PETERS CO., PHOTO-LITHO., WASHINGTON, D. C.

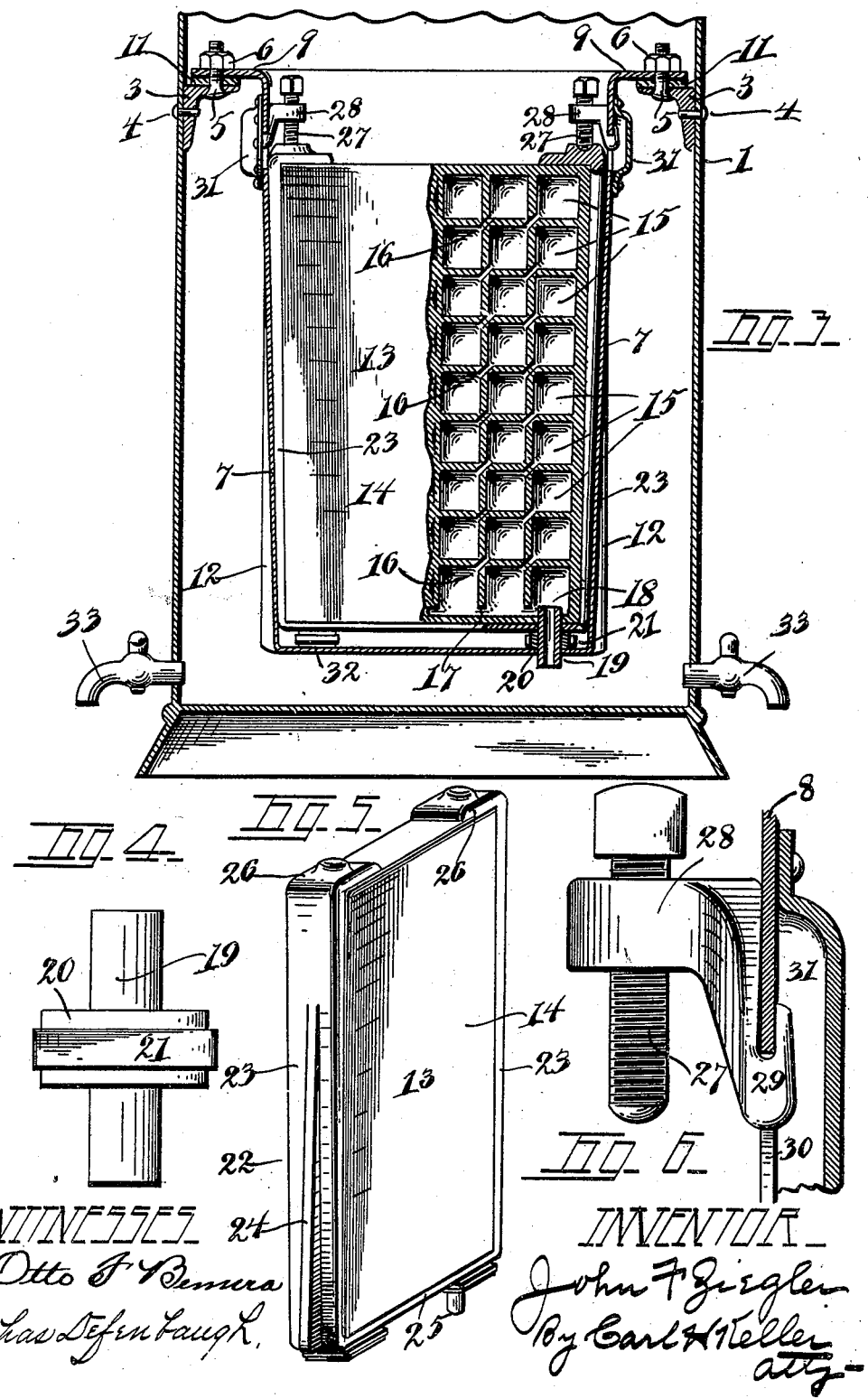

UNITED STATES PATENT OFFICE.

JOHN F. ZIEGLER, OF TOLEDO, OHIO.

FILTER.

SPECIFICATION forming part of Letters Patent No. 645,500, dated March 13, 1900.

Application filed June 24, 1899. Serial No. 721,683. (No model.)

*To all whom it may concern:*

Be it known that I, JOHN F. ZIEGLER, of Toledo, county of Lucas, and State of Ohio, have invented certain new and useful Improvements in Filters; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention has reference to a filter to be employed in office-buildings, public parks, exposition grounds, and other places where the consumption of water is very great, necessarily requiring a filter of great capacity.

With the object in view of supplying a filter of this kind my invention is constructed.
My invention is characterized by certain novel details of construction whereby the same can be easily assembled and as easily taken apart for the purpose of repairing when necessary.
In the drawings, Figure 1 is a perspective view of my filter. The outer shell, however, is shown partly cut away and discloses on the interior the angle-iron frame riveted to the shell and on which the basket shown in Fig. 2 is hung. Fig. 2 is a perspective of the basket I employ and into which are adapted to be inserted filter-blocks, one of which I have shown in perspective in Fig. 5. Fig. 3 is a vertical cross-section of my filter, showing the manner of assembling the same. The filter-brick in this view is shown half in section and half in full lines. Fig. 4 is an elevation of the tube and packing thereon which I employ to conduct the water from the interior of the filter-brick to the pure-water chamber. Fig. 5 is a perspective view of one of my filter-blocks. Fig. 6 is an elevation of the hooked bracket I employ to hold the blocks in position.

The shell 1 of the filter is constructed of sheet metal, preferably iron or steel, and is made long and narrow. In Fig. 1 I have shown my filter as it appears; but because of the space on sheet being limited I have shown the same much shorter than is my practice to construct the same. For use at expositions the shell 1 is made from ten to fifteen feet in length, and the basket (shown in Fig. 2) I also make much longer to receive from forty to sixty filter-blocks instead of three, as shown in the drawings. Shell 1 is formed with a hinged cover 2, which is opened when ice and water are to be put into the filter.

3 is an angle-iron frame made to closely fit the interior of shell 1 and is secured thereto by rivets 4. Extending from frame 3 are screw-threaded studs 5, adapted to receive nuts 6.

7 is a basket, made of metal, having the box-like portion 8 slightly tapered, being of less diameter at the bottom than at top, and the flange 9 integral with portion 8 and formed with holes 10, through which studs 5 pass when the basket is placed in position in the filter. Before placing the basket in position, however, I place a packing 11, of asbestos or other suitable material, entirely around the frame 3, after which the basket is placed in position and the nuts 6 screwed upon the studs 5, thereby compressing the packing 11 between the flange 9 and the frame 3 and preventing the passage of water. The box-like portion 8 of the basket is pressed in the form of parallel channels or grooves on the interior thereof, showing as ridges 12 on the exterior, which are adapted to receive filter-blocks 13. The body of filter-block 13 is a rectangular brick 14, of porous filtering material, and is formed with a plurality of approximately-spherical cells 15, having connecting-passages 16, which lead the water from the cells to the lower tier of cells, from which it is carried by a passage 17 to the point of outlet 18. At this point the brick is formed with a circular opening, into which I insert a tube 19, of any suitable material, but preferably of porcelain, having a surrounding packing of rubber 20. Around the rubber packing I place a band of metal 21. After the brick 13 is formed I secure the same within a cast-iron frame 22, having the tapered side portions 23, formed with ridges or runners 24 thereon. This ridge has a twofold purpose in that it is used to guide the block in position in the basket and also to prevent the brick in the block from collapsing when clamped in position. Frame 22 is further formed with a bottom piece 25 and the portions 26 disposed at right angles to side pieces 23. The bottom piece 25 is formed with an opening coincident with a circular opening in the bottom of the brick, through which the tube 19 is inserted. The portions 26 are formed on the upper sides thereof with a rounded depression, into which seat the rounded ends of the screws 27, screwed into brackets 28, having hooked extensions 29. The box-like portion of basket 8 is formed with a plurality of circular openings 30, into which the hooked extensions 29 are inserted and then hooked to the edges of the opening. To prevent water from passing through the openings 30, I place over the same metal covers 31, securely riveted to the box-like portion 8. Portion 8 is also formed with an opening which serves as a passage for tube 19.

32 is a rubber cushion similar in all respects to packing 20, but having no central opening for the reception of a tube, simply acting as a cushion for the block.

In assembling my filter the basket is hung in position, as has been shown in the foregoing description. The blocks, as shown in Fig. 5, are then slid in position into the channels formed in the basket 7. The brackets 28 are hooked onto the edges of the circular openings 30. The screws 27 are made to press down upon the blocks and to compress the rubber cushion 32 and the rubber packing 20 surrounding tube 19. In this manner any leakage around the tube 19 is prevented.

To prevent the rubber cushion 32 and the packing 20 from unduly spreading, I surround the same with a metal band 21.

33 represents ordinary faucets on both the front and the rear of the filter to draw off the water after being filtered.

In the operation of my filter water is introduced into the top of the same by raising the cover 2 of the shell, thereby occupying the chamber immediately above the filter-blocks. The water then passes through the filter-blocks by percolation and is withdrawn from the chamber below the filter-blocks through faucets 33.

In cleaning my filter a quantity of water is allowed to remain therein and to surround the filter-blocks. An ordinary brush is then employed to remove any deposit upon the blocks, after which the water containing the impurities is withdrawn by means of a hose acting as a siphon.

It will be observed that by disposing the angle-iron frame, as shown, intermediate of the height of the filter-shell bulging of the shell due to internal pressure will be prevented. I also place the filter-block a maximum distance from the surface of the water, whereby the greatest pressure is brought to bear thereon, insuring the greatest passage of water. By forming my blocks of a multitude of spherical cells on the interior they exert the greatest possible resistance to external pressure. Also by placing my blocks on cushions in the basket a passage is left beneath the blocks for water when the filter is being cleaned.

Although I have shown my filter as the gravity-filter, I may also use the same as a pressure-filter with slight modifications, in which case the cover 2 forms a closure for the top of the shell, and the necessary conducting-pipes would have to be attached.

I wish to lay particular stress upon the practical construction of my filter-block. By the construction which I have shown all possibility of collapsing through pressure from clamping devices to hold the same in position is overcome.

What I claim is—

1. In a filter, a filter-shell, having a basket suspended therein intermediate of its height, grooves formed in the basket into which are adapted to be inserted filter-blocks, in parallel relation, and means for clamping the blocks in the basket, substantially as described.

2. In a filter, a rectangular angle-iron frame secured to the filter-shell, a basket hung thereon, grooves formed in the basket, filter-blocks having ridges on the sides thereof adapted to enter the grooves, elastic cushions upon which the blocks seat, and clamping devices to cause the filter-blocks to press upon the elastic cushions, substantially as described.

3. For employment in a filter, a filter-block, consisting of a flat rectangular brick, having on the interior thereof a plurality of approximately-spherical cells, connected by passages; a frame in which the brick is secured having side pieces, on which are formed longitudinal ridges, a tube forming a passage for water from the interior of the brick, an elastic cushion, surrounding the tube and serving as a packing therefor and also as a cushion for the block, substantially as described.

4. A clamp for securing a filter-block in a filter, having a hooked extension designed to enter openings in the sides of the filter-basket and engage the edge of the opening, a screw threaded into the body of the clamp having a rounded end to enter the rounded recess in the frame of the filter-block substantially as shown and described.

5. The tube for conducting the water from the interior of the filter-block consisting of the portion 19 having the rubber packing thereon surrounded by the metal band 21, substantially as shown and described.

In testimony that I claim the foregoing as my own I affix my signature in presence of two witnesses.

JOHN F. ZIEGLER.

Witnesses:
CARL H. KELLER,
CHAS. DEFENBAUGH.